(12) United States Patent
Havinis et al.

(10) Patent No.: US 6,295,454 B1
(45) Date of Patent: Sep. 25, 2001

(54) SYSTEM AND METHOD FOR PROVIDING CHRONICLED LOCATION INFORMATION FOR TERMINAL-BASED POSITION CALCULATION

(75) Inventors: Theodore Havinis, Plano; David Boltz, Garland, both of TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/272,714

(22) Filed: Mar. 18, 1999

(51) Int. Cl.[7] ................. H04Q 7/20; H04B 1/38
(52) U.S. Cl. ............ 455/456; 455/457; 455/558
(58) Field of Search ................ 455/456, 457, 455/404, 557, 558, 550, 410, 414; 340/342; 342/357

(56) References Cited

U.S. PATENT DOCUMENTS

| | | | |
|---|---|---|---|
| 5,389,934 | * 2/1995 | Kass | 342/357 |
| 5,446,465 | * 8/1995 | Diefes et al. | 342/357 |
| 5,465,405 | * 11/1995 | Thompson | 455/558 |
| 5,731,757 | * 3/1998 | Layson, Jr. | 340/573 |
| 5,731,785 | * 3/1998 | Lemelson et al. | 342/357 |
| 5,835,907 | * 11/1998 | Newman | 707/10 |
| 6,097,958 | * 8/2000 | Bergen | 455/456 |
| 6,216,007 | * 4/2001 | Havinis et al. | 455/456 |

* cited by examiner

*Primary Examiner*—Vivian Chang
*Assistant Examiner*—Duc Nguyen
(74) *Attorney, Agent, or Firm*—Jenkens & Gilchrist, P.C.

(57) ABSTRACT

A telecommunications system and method is disclosed for requiring a Mobile Station (MS) that calculates it's own position within a cellular network to report that calculated location to the requester. The MS can determine and store the location of the MS, along with a time stamp, in a memory therein at predefined intervals determined by the requestor. Once the location information has been calculated and stored, the MS can report all of the relevant historical location information to the requestor at predefined intervals determined by the requestor.

28 Claims, 10 Drawing Sheets

SYSTEM AND METHOD FOR PROVIDING CHRONICLED LOCATION INFORMATION FOR TERMINAL-BASED POSITION CALCULATION

BACKGROUND OF THE PRESENT INVENTION

1. Field of the Invention

The present invention relates generally to telecommunications systems and methods for positioning a mobile station within a cellular network, and specifically to providing historical location information by mobile stations that position themselves.

2. Background and Objects of the Present Invention

Cellular telecommunications is one of the fastest growing and most demanding telecommunications applications. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

With reference now to FIG. 1 of the drawings, there is illustrated a GSM Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC 14 provides a circuit switched connection of speech and signaling information between a Mobile Station (MS) 20 and the PLMN 10. The MSC/VLR areas 12, in turn, include a plurality of Location Areas (LA) 18, which are defined as that part of a given MSC/VLR area 12 in which the MS 20 may move freely without having to send update location information to the MSC 14 that controls the LA 18. Each LA 18 is divided into a number of cells 22. The MS 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the cell 22 for which it is responsible. It should be understood that the BSC 23 may be connected to several BTS's 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information, for subscribers registered within that PLMN 10. The HLR 26 may be co-located with a given MSC 14, integrated with the MSC 14, or alternatively can service multiple MSCs 14, the latter of which is illustrated in FIG. 1.

Determining the geographical position of an MS 20 within a cellular network 10 has recently become important for a wide range of applications. For example, location services (LCS) may be used by transport and taxi companies to determine the location of their vehicles. In addition, for emergency calls, e.g., 911 calls, the exact location of the MS 20 may be extremely important to the outcome of the emergency situation. Furthermore, LCS can be used to determine the location of a stolen car, for the detection of home zone calls, which are charged at a lower rate, for the detection of hot spots for micro cells, or for the subscriber to determine, for example, the nearest gas station, restaurant, or hospital, e.g., "Where am I" service.

As can be seen in FIG. 2 of the drawings, upon a network positioning request, the MSC 14 obtains, from the serving BTS 24 and BSC 23, a Timing Advance (TA) value, which corresponds to the amount of time in advance that the MS 20 must send a message in order for the serving BTS 24 to receive it in the time slot allocated to that MS 20. The TA value, in turn, provides location information regarding the MS 20 location. This is due to the fact that when a message is sent from the MS 20 to the BTS 24, there is a propagation delay, which depends upon the distance between the MS 20 and the BTS 24. The TA values are expressed in bit periods, and can range from 0 to 63, with each bit period corresponding to approximately 550 meters between the MS 20 and the BTS 24.

This TA value is forwarded to a Serving Mobile Location Center (SMLC) 270 for use in assisting the calculation of the geographical location of the MS 20. It should be noted that the SMLC 270 can use a number of different positioning mechanisms, including, but not limited to, Time of Arrival (TOA), which is a network-based positioning method, Enhanced Observed Time Difference (E-OTD) and Global Positioning System (GPS), which are both MS-based positioning methods. After the SMLC 270 calculates the MS 20 location, this location can be sent to a Location Application (LA) 280 that requested the positioning. It should be noted that the requesting LA 280 could be located within the MS 20 itself, within the MSC 14 or could be an external node, such as an Intelligent Network (IN) node. If the LA 280 is not within the MS 20 or within the MSC 14, the location information is sent to the requesting LA 280 via the MSC 14 and a Gateway Mobile Location Center (GMLC) 290.

As mentioned above, two common types of MS-based positioning methods are the E-OTD method and the GPS method. For the GPS method, the MS 20 can have a Global Positioning System (GPS) receiver built into it, which is used to obtain positioning data, which is sent to the SMLC 270 to determine the location of the MS 20. For the E-OTD method, the MS 20 can collect positioning data based on the Observed Time Difference (OTD) between the time a BTS 24 sends out a signal and the time the MS 20 receives the signal. This time difference information can be sent to the SMLC 270 for calculation of the location of the MS 20, or the MS 20 itself, with knowledge of the location of the BTS 24, can determine it's location. It should be noted that it is expected in the near future for the GPS receiver within the MS 20 to be able to calculate the MS 20 location.

By utilizing the E-OTD or GPS positioning method and implementing the location calculation functionality within the MS 20 itself, it is no longer necessary to have active two-way communication between the MS 20 and the network 10, which advantageously reduces the signaling traffic on the network 10. However, since the network 10 is not needed to determine the MS 20 location, there must be some functionality in the MS 20 that requires the MS 20 to report it's location to the requesting LA 280.

It is, therefore, an object of the present invention to provide an application in the MS that reports the calculated MS location to the network.

It is a further object of the present invention to allow the MS to store calculated location information in a chronicled list of location information within the MS.

It is still a further object of the present invention to permit a requesting LA to determine a reporting frequency, in addition to a calculation frequency, for an MS.

It is still a further object of the present invention to require the MS to send a chronicled list of location information to the network at predefined intervals.

SUMMARY OF THE INVENTION

The present invention is directed to telecommunications systems and methods for requiring a Mobile Station (MS) that calculates it's own position within a cellular network to report that calculated location to the requester. The MS can determine and store the location of the MS, along with a time stamp, in a memory therein at predefined intervals determined by the requester. Once the location information has been calculated and stored, the MS can report all of the relevant historical location information to the requester at predefined intervals determined by the requester. To initiate this feature in the MS, a Short Message Service (SMS) or Unstructured Supplementary Service Data (USSD) message can be sent from the requester, which instructs the MS to begin the collection of location information. The short message preferably also contains information concerning how often the MS should position itself and how often to report the chronicled location information. In addition, the short message would also contain an indication of where to send the chronicled location information.

BRIEF DESCRIPTION OF THE DRAWINGS

The disclosed invention will be described with reference to the accompanying drawings, which show important sample embodiments of the invention and which are incorporated in the specification hereof by reference, wherein:

FIG. 3 illustrates providing a serving mobile location center with various terminal-based positioning methods that a particular mobile station is capable of;

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
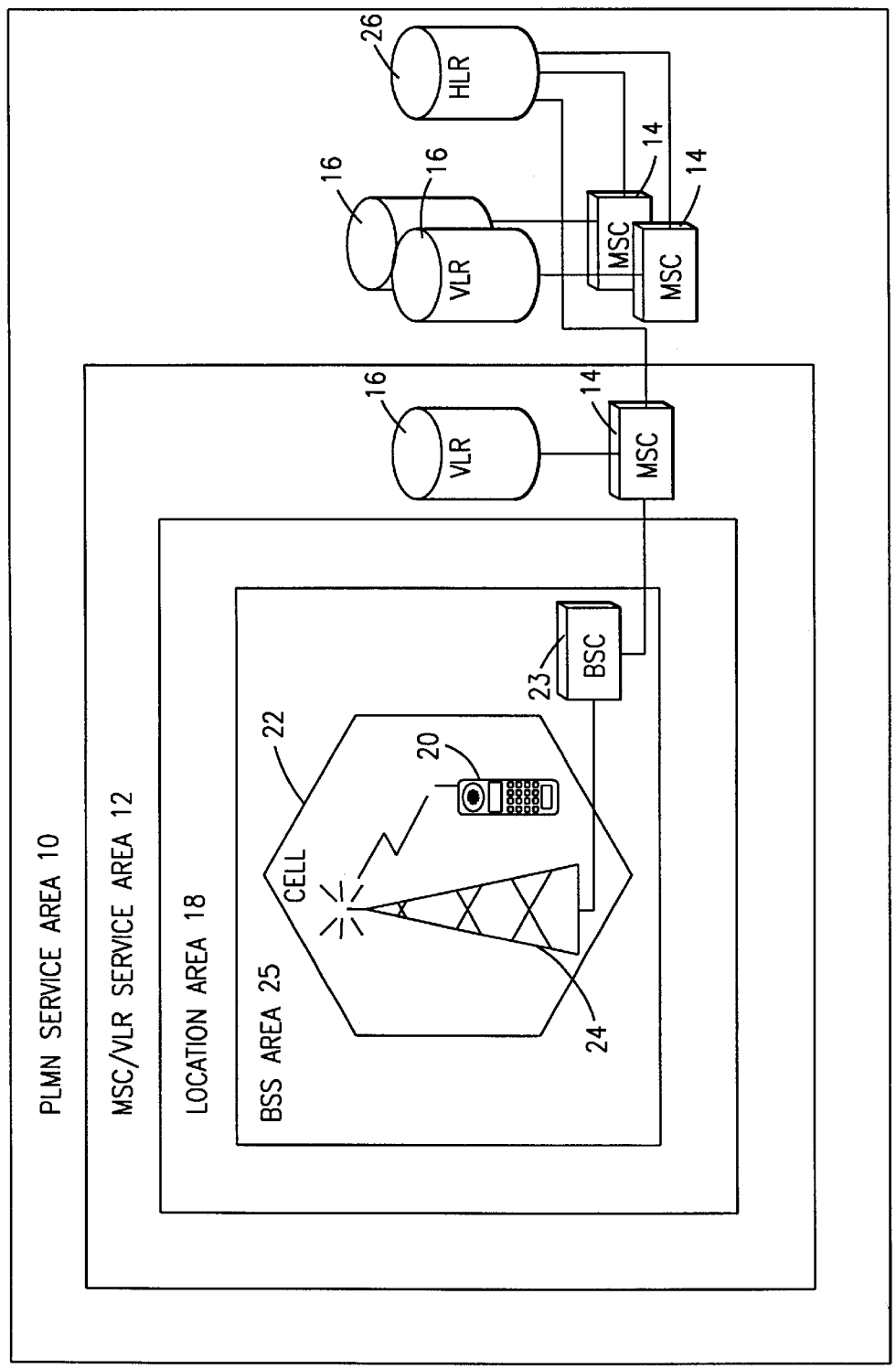
FIG. 1 is a block diagram of a conventional wireless telecommunications system.
Figure 2:
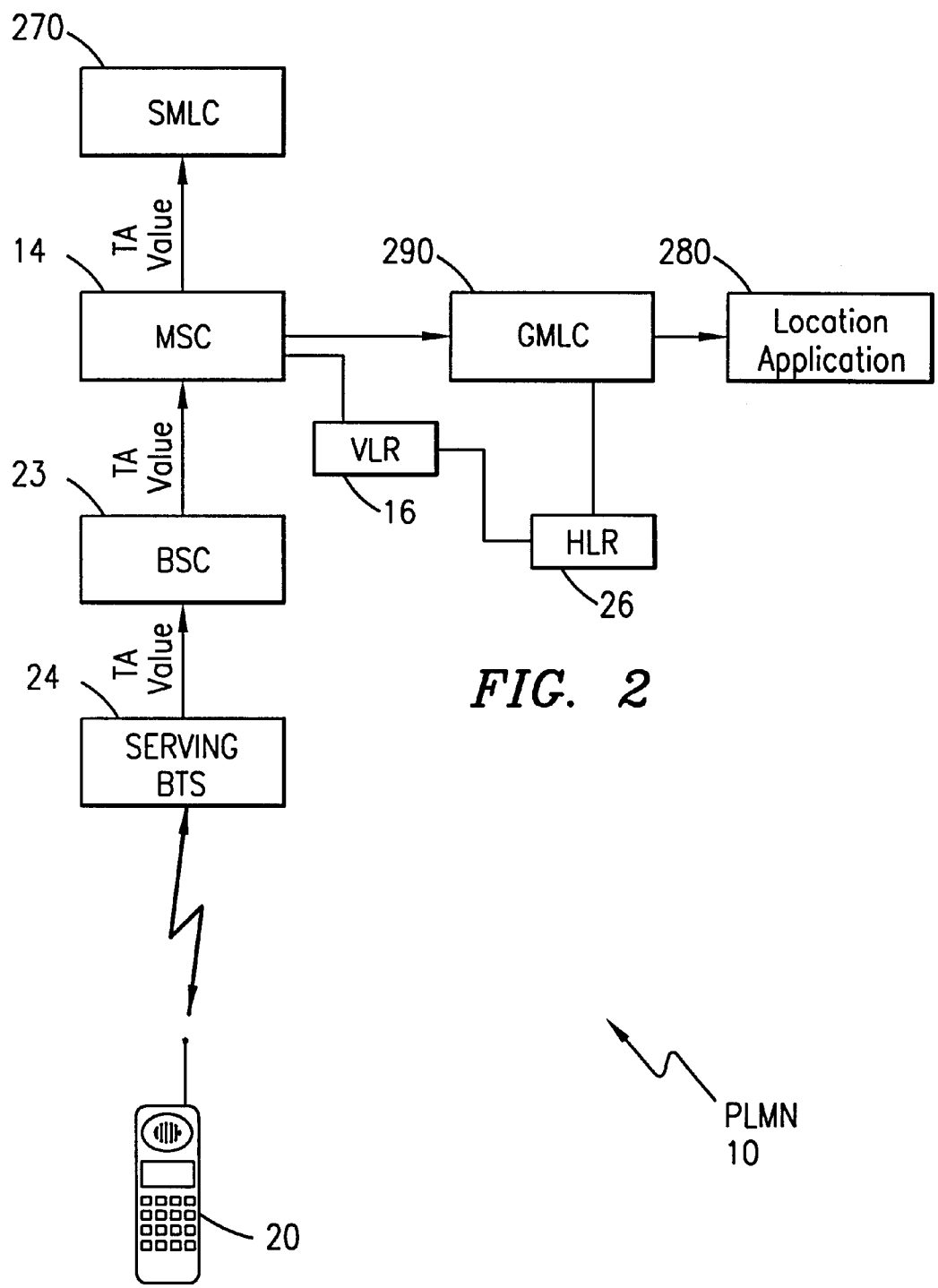
FIG. 2 is a block diagram illustrating the positioning of a mobile station within a cellular network.
Figure 3:
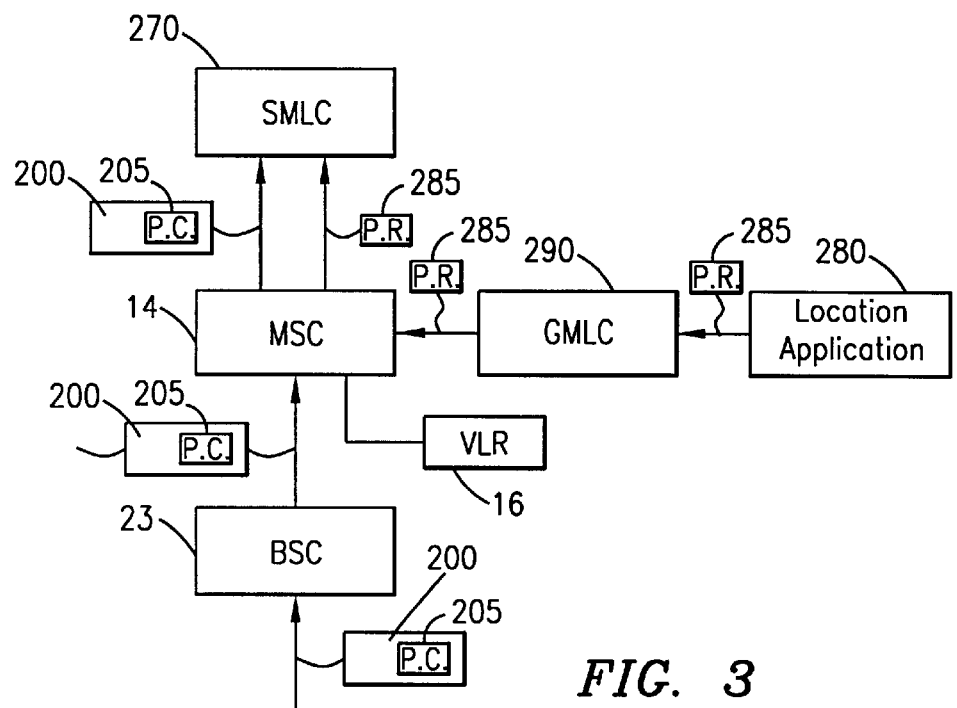
Figure 3:
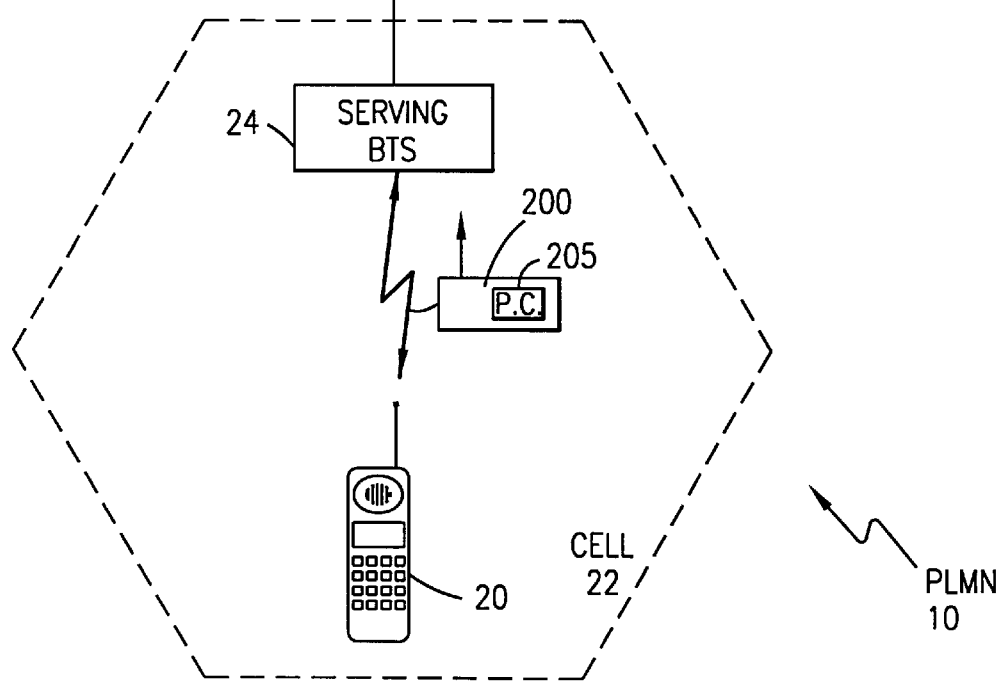

With reference now to FIG. 3 of the drawings, when a positioning request 285 for a particular target Mobile Station (MS) 20 is received by a Serving Mobile Location Center (SMLC) 270 serving the cell 22 within the Public Land Mobile Network (PLMN) 10 that the MS 300 is currently located in, the SMLC 270 must choose the optimum positioning method available. Positioning methods can be network-based, e.g., Timing Advance (TA) method, Time of Arrival (TOA) method, or Angle of Arrival (AOA) method, or terminal-based, e.g., Global Positioning System (GPS) method, Observed Time Difference (OTD) method, or Enhanced OTD (E-OTD) method. In order for the SMLC 270 to have knowledge of the terminal-based positioning methods, this information must be sent to the SMLC 270 together with the positioning request 285. Therefore, the MS 20 positioning capabilities can be sent to a serving Mobile Switching Center/Visitor Location Register (MSC/VLR) 14/16 when the MS 20 registers with the MSC/VLR 14/16.

For example, in GSM systems, the MS 20 positioning method capabilities can be passed towards the MSC/VLR 14/16 with the existing GSM message BSSMAP CLASSMARK UPDATE 200, as is understood in the art. Specifically, as discussed in co-pending patent application Ser. No. 09/037,071 to Stephen Hayes et al., which is hereby incorporated by reference, the "classmark information element 3" in the CLASSMARK UPDATE message 200 can be extended to include MS 20 positioning capabilities 205. As is known in the art, the CLASSMARK UPDATE information message 200 typically describes attributes of the MS 20, such as encryption capabilities, RF power level supported and short message capability. The MS 20 positioning methods can be sent towards the network 10 as part of controlled early classmark sending, during dedicated mode, when the MS 20 wishes to indicate to the MSC/VLR 14/16 a change of positioning capabilities, after a BSSMAP CLASSMARK REQUEST message from the MSC/VLR 14/16, in which case the MS 20 can send a CLASSMARK UPDATE message 200. Alternatively, the MS 20 can send a HANDOVER REQUEST (not shown) including the MS 20 positioning capabilities 205 to the target BSC 23 via a Base Transceiver Station (BTS) 24.

The positioning information 205 included within the CLASSMARK UPDATE message 200 shall indicate to the MSC/VLR 14/16 whether the MS 20 can support terminal-based positioning, the type of terminal-based positioning methods supported, and whether the MS 20 is capable of performing location calculations based upon the positioning measurements that it performed itself. Once the MSC/VLR 14/16 receives the terminal-based positioning methods, this information can be sent to the SMLC 270 for later use in determining the optimum positioning method.

Thus, if the MS 20 has terminal-based positioning capabilities, along with terminal-based location calculation abilities, when the SMLC 270 receives the positioning request 285, the SMLC 270 can opt to allow the MS 20 to both obtain positioning measurements and to calculate it's own location based upon those positioning measurements. However, as discussed hereinbefore, if the MS 20 obtains the positioning measurements and determines it's own location, the active two-way communication normally involved in the positioning process between the MS 20 and the network 10 is eliminated, which reduces the accountability by the MS 20 to report it's location to a requesting Location Application (LA) 280 via a Gateway Mobile Location Center (GMLC) 290.

Figure 4:
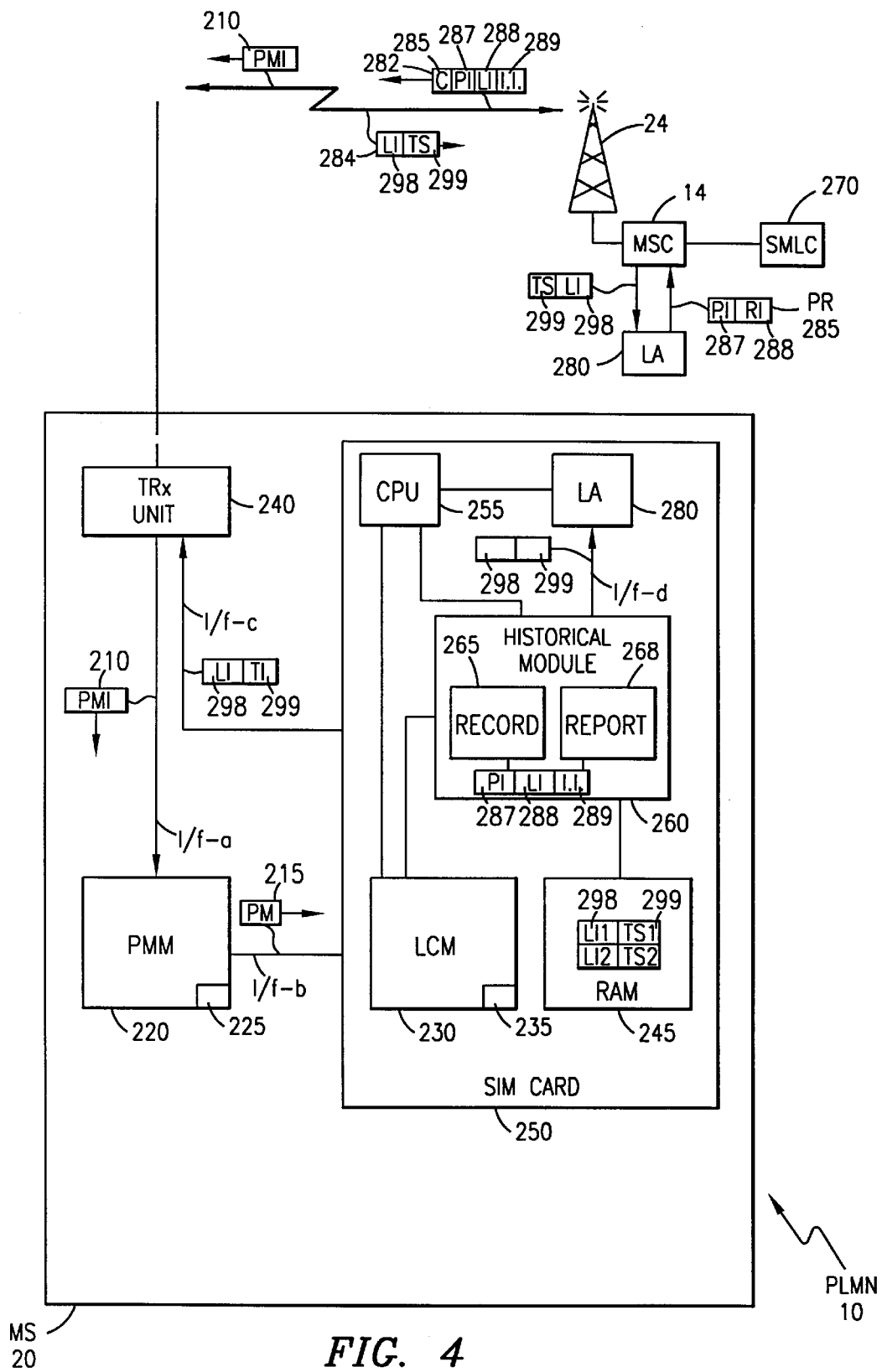
FIG. 4 illustrates the recording and reporting of terminal-based calculated location information in accordance with embodiments of the present invention.

Therefore, as shown in FIG. 4 of the drawings, an additional historical module 260 can be included within the MS 20 to ensure that the MS 20 records and reports it's location to the requesting LA 280. When the LA 280 sends the positioning request 285, the LA 280 can also include within the positioning request 285, a positioning indicator 287, which indicates how often the MS 20 should position itself and a reporting indicator 288, which indicates how often the MS 20 should report the chronicled location information 298. If the SMLC 270 determines that the MS 20 should calculate it's own location, the SMLC 270 sends, for example, a Short Message Service (SMS) message or an Unstructured Supplementary Service Data (USSD) message 282 to the MS 20 via a serving BTS 24. This command message 282 includes a command 283 to begin the collection of location information, the positioning indicator 287, the reporting indicator 288 and an identity indicator 289, which indicates the address of the LA 280 or other entity where the MS 20 must send the chronicled location information 298. The positioning indicator 287, reporting indicator 288 and identity indicator 289 are stored in the historical module 260.

Once the MS 20 receives the SMS or USSD command message 282, the MS 20 begins to calculate its' own location. As is understood in the art, for terminal-based location calculation methods, the cellular network 10 serving the MS 20 sends to the MS 20 positioning measurement information 210 along with other necessary information, depending upon the positioning method used, regardless of the location of the MS 20. The MS 20 calculates it's own location in idle or dedicated mode based upon its own positioning measurements 215, the additional information 210 supplied by the network 10 and a location calculation function within the MS 20.

Specifically, the location calculation within the MS 20 can be carried out by utilizing a Positioning Measurement Module (PMM) 220 within the MS 20 for performing the positioning measurements 215 with the aid of information 210 from the network 10 and an algorithm 225 specific to the positioning method used. Thereafter, a Location Calculation Module (LCM) 230 within the MS 20 can convert the positioning measurements 215 to location information 298 with the aid of the network information 210, e.g., BTS 24 coordinate information, and an algorithm 235 for performing the conversion.

When the PMM 220 obtains the positioning measurements 215 with the aid of information 210 from the network 10, which is sent over interface I/f-a from a Transceiver (TRX) unit 240, and with the aid of the algorithm 225 specific to the positioning method used, the PMM 220 sends the positioning measurements 215 to the LCM 230 within a smart card 250, e.g., a Subscriber Identity Module (SIM) card, over interface I/f-b. The LCM 230 uses these positioning measurements 215 as well as the network information 210 and the positioning algorithm 235 to perform the conversion and calculate the location 298, e.g., X,Y coordinates, of the MS 20.

Once the LCM 230 calculates the location information 298, recording logic 265 within the historical module 260 within the SIM card 250 stores the calculated location 298, and preferably, a time stamp 299, in a memory, such as a Random Access Memory (RAM) 245 within the SIM card 250. The MS 20 will repeat this location calculation process at predefined intervals specified by the positioning indicator 287 received in the SMS or USSD command message 282. For example, the positioning indicator 287 could instruct the MS 20 to position itself every 5 minutes.

When reporting logic 268 within the historical module 260 within the SIM card 250 determines that the predefined amount of elapsed time sent to the MS 20 in the recording indicator 288 in the SMS or USSD command message 282 has passed, the reporting logic 265 accesses the memory 245 and retrieves all of the chronicled location information 298 and associated time stamps 299. The reporting logic 268 transmits this historical data 298 and 299 to the requesting LA 280 via another SMS or USSD message 284. It should be noted that the predefined time interval for reporting sent in the reporting indicator 288 can be overridden at any given time by the requesting LA 280 sending another SMS or USSD message (not shown), which requests all current location data from the MS 20. The historical module 260 can also be deactivated by the requesting LA 280 sending another SMS or USSD message (not shown). In either case, the historical module compares the identity information 289 stored therein with the identity information included in the new SMS or USSD message to ensure that the requesting LA 280 has the authority to override or deactivate the previously sent SMS or USSD command message 282.

The reporting logic 268 can transmit the chronicled historical location information 298 and associated time stamps 299 to the requesting LA 280 by passing the location information 298 and associated time stamps 299 to either the TRX unit 240 over interface I/f-c for transmission to an LA 280 within the network 10 or to an internal LA 280 over interface I/f-d. In addition, it should be understood that the SIM card 250 preferably contains a central processing unit (CPU) 255 for controlling the flow of information between the PMM 220, LCM 230, RAM 245, historical module 260, TRX unit 240 and any internal LA 280.

Figure 5:
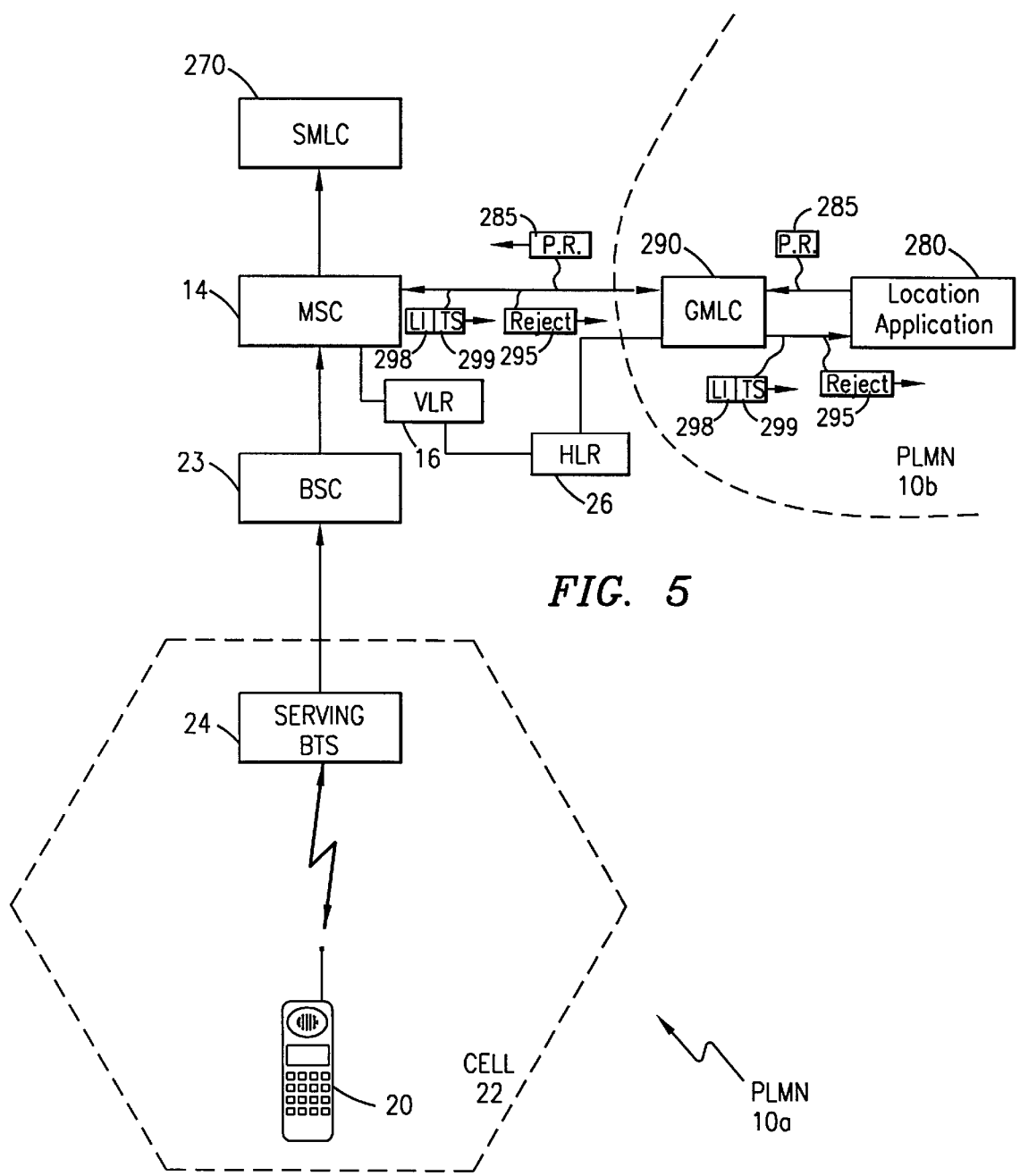
FIG. 5 illustrates a sample positioning process.
Figure 6:
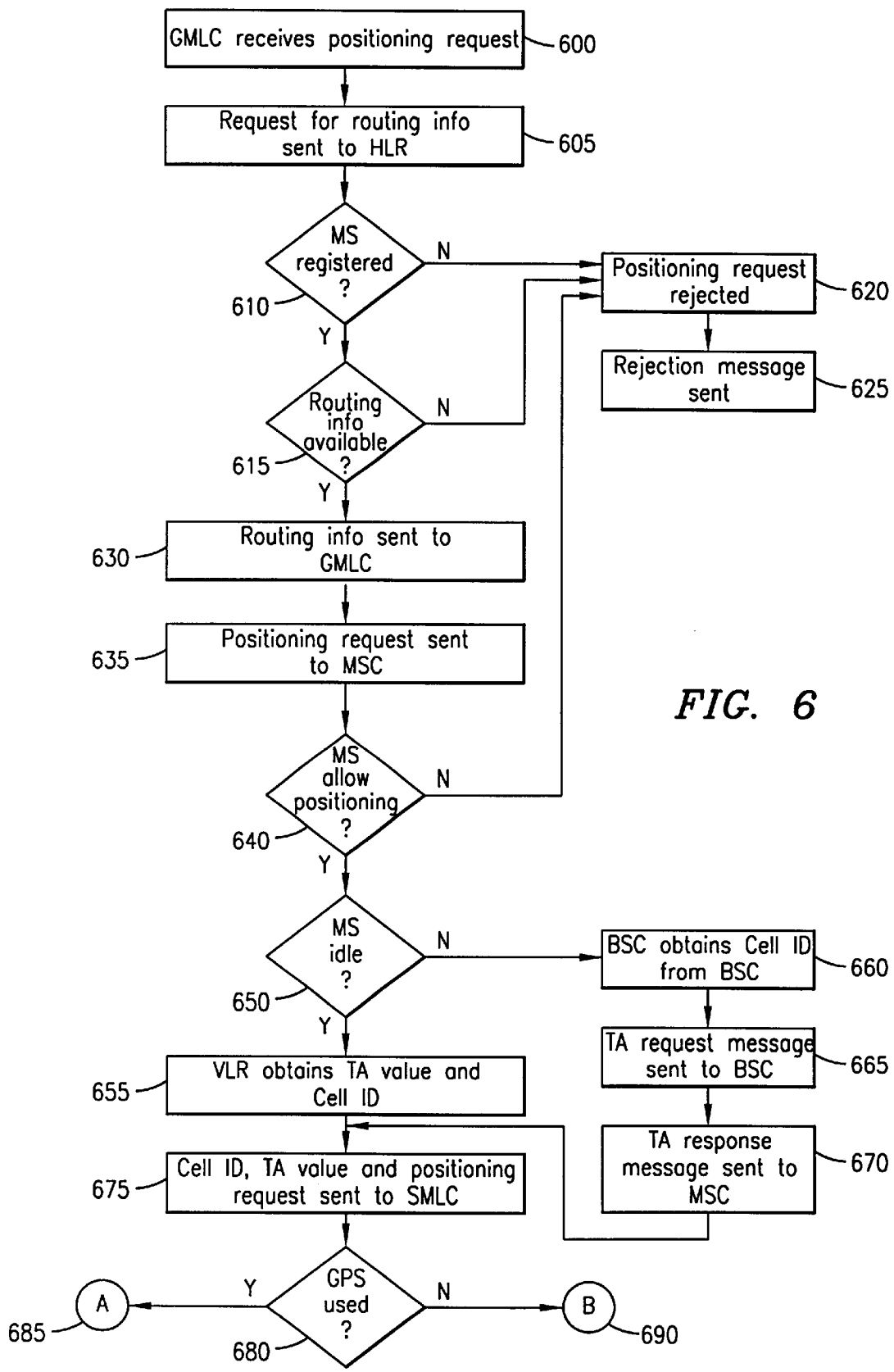
FIG. 6 shows steps in implementing the sample positioning process shown in FIG. 5 of the drawings.

A more complete understanding of aspects of the positioning process involved in the present invention will now be described with reference to FIG. 5 of the drawings, which will be described in connection with the steps listed in FIG. 6 of the drawings. Positioning of a particular target MS 20 typically begins by a Location Application (LA) 280 (or location node 280) sending a positioning request 285, which specifies the particular Mobile Station Integrated Services Digital Network (MSISDN) number associated with the particular target MS 20 to be positioned, to a Gateway Mobile Location Center (GMLC) 290 within the Public Land Mobile Network (PLMN) 10b of the LA 280 (step 600). In addition, the positioning request 285 can include the positioning indicator 287 and the reporting indicator 288 as shown in FIG. 4 of the drawings.

When the GMLC 290 receives the positioning request 285 (step 600), the GMLC 290 sends a request for routing information (step 605), e.g., the address of the serving MSC 14 within the PLMN 10a that the MS 20 is currently located in, to the MS's Home Location Register (HLR) 26, using the MS's 20 directory number as a global title. The signaling network, e.g., the Signaling System #7 (SS7) network (not shown), can perform a global title translation on the MSISDN and route the request to the appropriate HLR 26 for the MS 20.

The HLR 26 checks its records to confirm that the MS 20 is registered in the HLR 26 (step 610), and that routing information for that MS 20 is available (step 615). If the MS 20 is not registered in the HLR 26 (step 610) or the routing information is not available (step 615), the positioning request 285 is rejected (step 620) and the GMLC 290 sends a rejection message 295 to the requesting LA 280 (step 625). However, if the MS 20 is registered in the HLR 26 (step 610) and routing information for the MSC 14 is available (step 615), the routing information, e.a, the MSC 14 address, is sent to the GMLC 290 (step 630). Using this MSC 14 address, the GMLC 290 transmits a MAP_PROVIDE_SUBSCRIBER_LOCATION message, which contains the positioning request 285, to the serving MSC 14 (step 635).

The MSC 14 verifies that the MS 20 allows positioning to be performed (step 640), e.g., by checking privacy information, such as a Subscriber Location Privacy Profile (SLPP), which is sent to the VLR 16 associated with the MSC 14 by the HLR 26. If the MS 20 does not allow positioning (step 640), the positioning request 285 is rejected (step 620) and a rejection message 295 is sent to the LA 280 (step 625).

However, if the MS 20 does allow positioning (step 640), and the MS 20 is in idle mode (step 650), the VLR 16 performs paging and authentication of the MS 20, along with ciphering of the positioning data. This procedure provides the current cell 22 ID and Timing Advance (TA) value for a serving Base Transceiver Station (BTS) 24 in a BSSMAP Complete layer 3 message, which is used to convey a paging response (step 655). However, if the MS 20 is in dedicated mode (step 650), e.g., involved in a call connection, the MSC 14 obtains the current cell 22 ID from a serving Base Station Controller (BSC) 23 (step 660) and sends a BSS-MAP TA request to the serving BSC 23 (step 665). The serving BSC 23 obtains a current TA value from the serving BTS 24 and returns this current TA value in a BSSMAP TA response to the MSC 14 (step 670).

Upon receipt of the current cell 22 ID and TA value (step 655 or 670), the MSC 14 sends a MAP_PERFORM_LOCATION message, which includes the current cell 22 ID and TA value, to the SMLC 270 associated with the MS's 20 current cell 22 location (step 675). The SMLC 270 determines the positioning method to use, e.g., Time of Arrival (TOA), Enhanced Observed Time Difference (E-OTD) or Global Positioning System (GPS) (step 680). If the positioning is successful, the MSC 14 returns the chronicled location information 298 and associated time stamps 299 to the LA 280, via the GMLC 290, as discussed in connection with FIG. 4 of the drawings.

In accordance with aspects of the present invention, two of the terminal-based positioning methods will now be described. One of these terminal-based positioning methods is the Global Positioning System (GPS) method. GPS is a well-known technology used by many military and civilian applications. It is based upon a constellation of satellites launched by the U.S. government beginning in 1978. The GPS satellites transmit the standard positioning service (SPS) signal, which is available for civilian applications on a 1575.42 MegaHertz carrier. Each satellite uses a unique 1023-chip Gold code at a rate of 1.023 MegaHertz, such that all codes repeat at 1 millisecond intervals.

Each satellite also transmits a unique 50 bit/second navigation message containing parameters that allow GPS receivers on earth to compute a precise position solution. The navigation message includes a precise time reference as well as parameters that precisely describe the orbital positions and clock corrections for the satellites. In general, GPS receivers compute a position solution by searching for all visible satellites, which can be accomplished by correlating the received signal with replicas of the respective Gold codes, demodulating the navigation message of each visible satellite to obtain a time reference and orbital position, computing a range estimate for each visible satellite that includes the GPS receiver clock uncertainty, and, if at least four satellites are visible, computing the GPS receiver position and clock correction using the range estimate.

Figure 7:
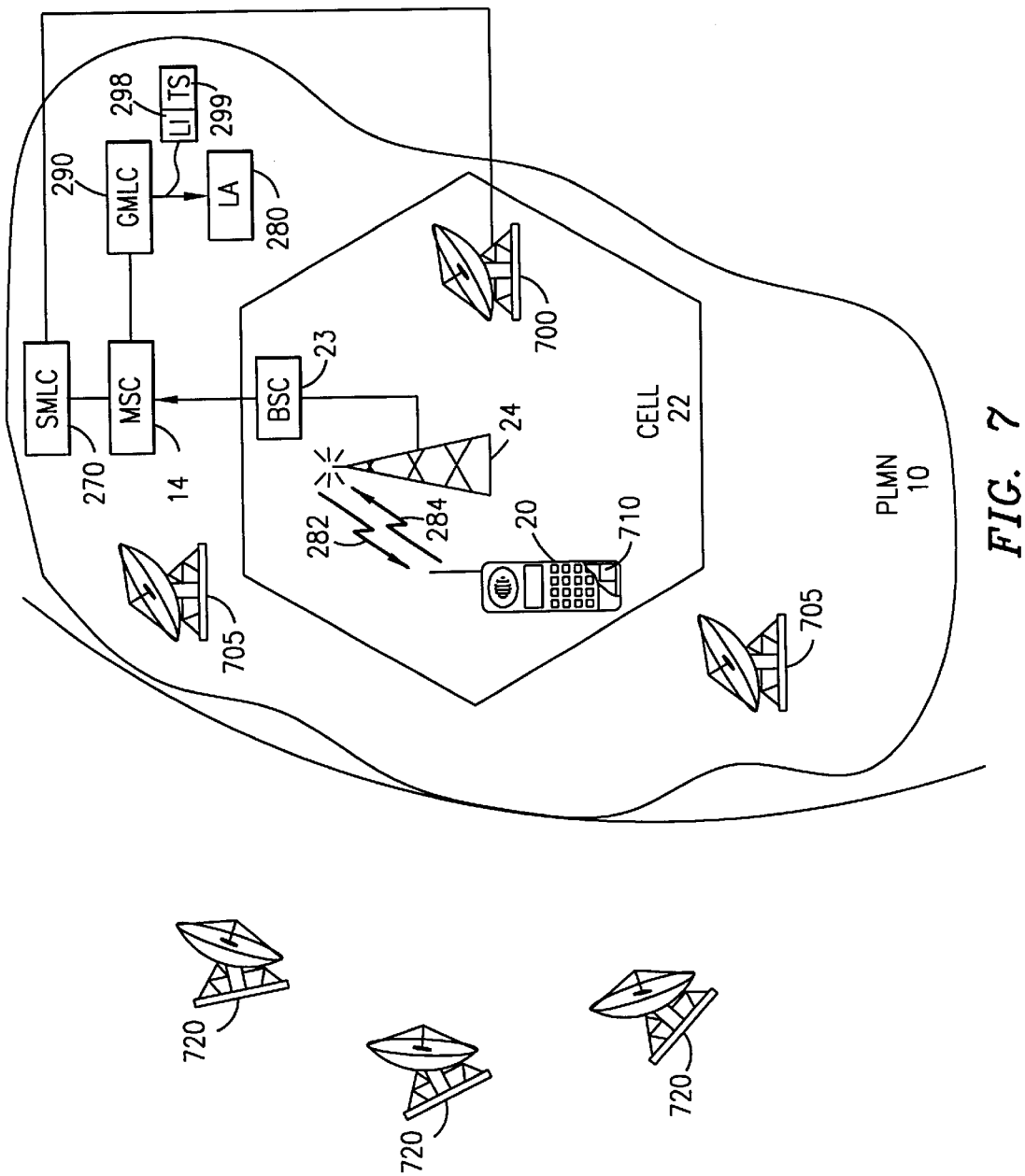
FIG. 7 illustrates a sample Global Positioning System (GPS) positioning method in accordance with embodiments of the present invention.
Figure 8:
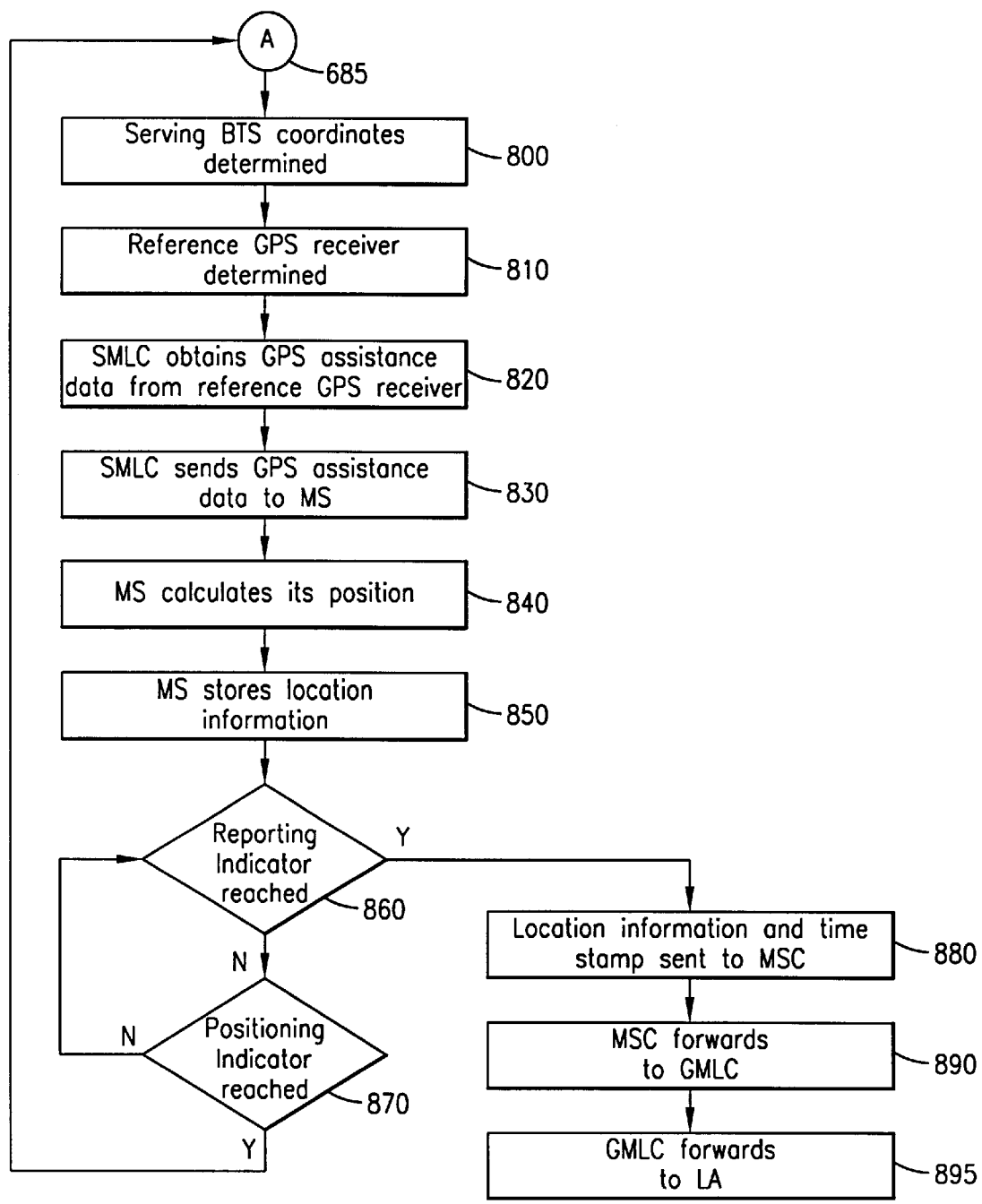
FIG. 8 shows steps in implementing the sample GPS positioning method shown in FIG. 7 of the drawings.

With reference now to FIG. 7 of the drawings, which will be described in connection with the steps listed in FIG. 8 of the drawings, when the SMLC 270 receives the cell 22 ID and TA value (step 675 in FIG. 6 of the drawings) and decides to utilize the GPS positioning method (steps 680 and 685 in FIGS. 6 and 8 of the drawings), the SMLC 270 can determine the coordinates of the serving BTS 24 (step 800), which preferably serves as the local position estimate for the MS 20, and from this information, as discussed in co-pending patent application Ser. No. 09/063,028 to Christopher H. Kingdon et al., which is hereby incorporated by reference, the SMLC 270 can determine a reference GPS receiver 700 (step 810), which is valid for the cell 22 that the MS 20 is located in. Alternatively, the SMLC 270 can determine the correct reference GPS receiver 700 (step 810) just from the cell 22 ID.

Multiple reference GPS receivers 700 and 705 are spaced throughout the PLMN 10 in order to provide accurate assistance GPS data to GPS receivers 710 within or attached to MS's 20. This data is used by the built-in GPS receiver 710 to determine the location of the MS 20 within the PLMN 10. The data in each reference GPS receiver 700 and 705 is valid in a radius of up to 300 kilometers around the reference GPS receiver 700 and 705 site (except for differential correction information, which is only valid for a radius of up to 50 kilometers), and therefore, the correct reference GPS receiver 700 for the cell 22 that the MS 20 is in must be determined to ensure the accuracy of the assistance GPS data. In addition, each reference GPS receiver 700 and 705 must be placed such that the antenna has an unobstructed view of the full sky.

After the SMLC 270 has determined the correct reference GPS receiver 700 (step 810), the SMLC 240 obtains, from the reference GPS receiver 700, the relevant assistance GPS data (step 820), such as the identity of the visible satellites 720, the orbital parameters of the satellites 720, clock corrections and differential corrections. A current requirement is that this assistance data be updated by the reference GPS receivers 700 and 705 about every thirty minutes (except for differential corrections, which are updated about every five seconds).

Once the current assistance GPS data is obtained by the SMLC 270 (step 820), this information is forwarded to the built-in or attached GPS receiver 720 within the MS 20 (step 830) via the serving MSC 14, BSC 23 and BTS 24. This assistance data corresponds to the network information 210 described in FIG. 4 of the drawings, and is preferably sent to the MS 20 (step 830) within the SMS or USSD command message 282. In addition, the built-in GPS receiver 270 encompasses at least the PMM 220 and LCS 230 shown in FIG. 4 of the drawings.

Using this assistance GPS data, the built-in GPS receiver 720 within the MS 20 can obtain the GPS positioning measurements to calculate its position 298 (step 840), e.g., latitude and longitude, and store the calculated location information 298 and a time stamp 299 in a memory 245 (shown in FIG. 4) therein (step 850). If the reporting indicator 288 (shown in FIG. 4) indicates that the MS 20 should report the location information 298 to the requesting LA 280 (step 860), the MS 20 sends this location information 298 back to the MSC 14 (step 858), in the return SMS or USSD message 284 described in FIG. 4 of the drawings. Thereafter, the MSC 14 can forward the location of the MS 20 to the GMLC 290 (step 890), which can, in turn, forward the location information 298 to the requesting LA 280 (step 895).

However, if the MS 20 does not yet need to report the location information 298 (step 860), the MS 20 waits until the positioning indicator 287 (shown in FIG. 4) indicates that the MS 20 should position itself again (step 870), and the MS 20 repeats the positioning process (step 685).

Figure 9:
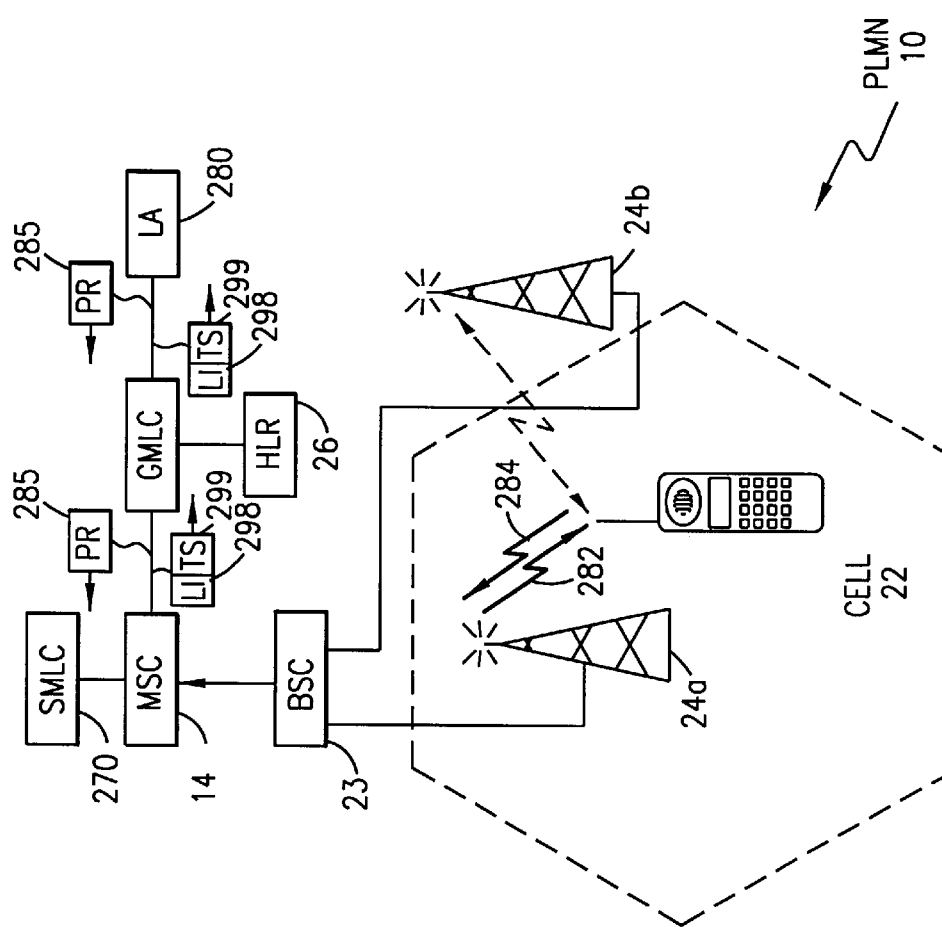
FIG. 9 illustrates a sample Enhanced-Observed Time Difference (E-OTD) positioning method in accordance with embodiments of the present invention.
Figure 10:
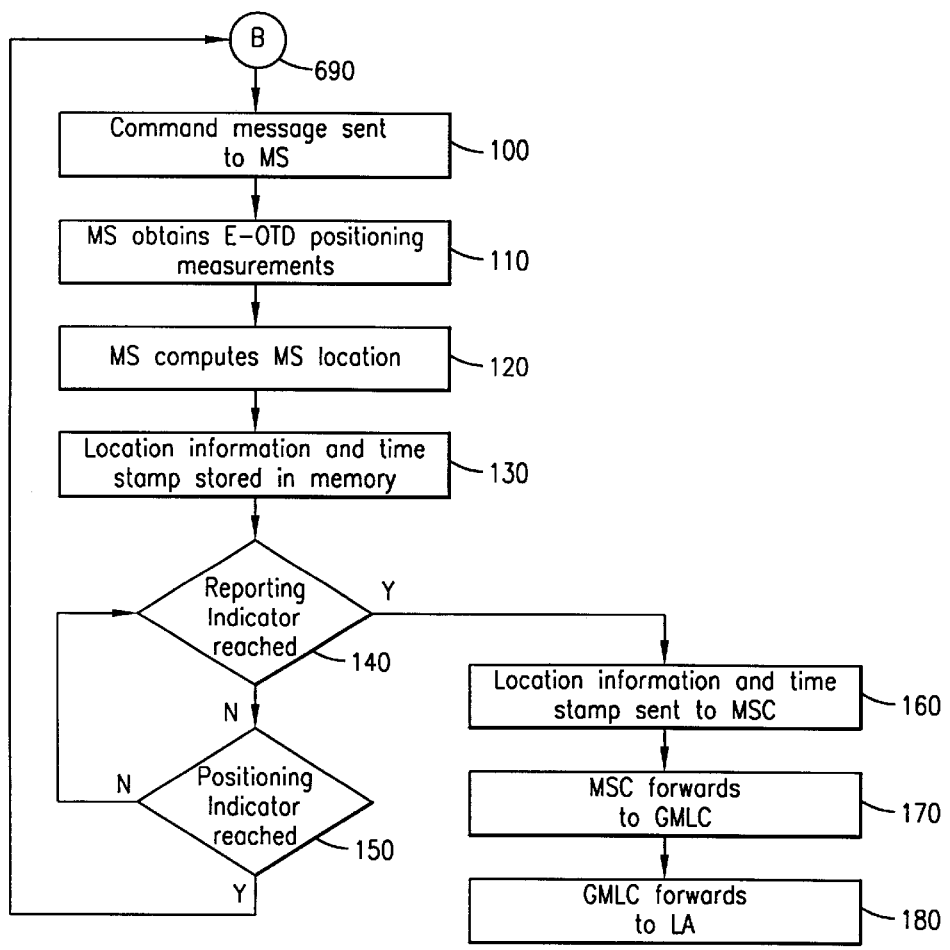
FIG. 10 shows steps in implementing the sample E-OTD positioning method shown in FIG. 9 of the drawings.

The second terminal-based positioning method is the E-OTD method. With reference now to FIG. 9 of the drawings, which will be described in connection with the steps listed in FIG. 10 of the drawings, the E-OTD method is based upon measurements in the MS 20 of the Enhanced Observed Time Difference of arrival of bursts from nearby pairs of BTS's 24a and 24b to the MS 20. To obtain accurate triangulation of the MS 20 position, E-OTD measurements are needed for at least three distinct pairs of geographically dispersed BTS's 24a and 24b, only one pair of which is shown in FIG. 9.

Thus, when the SMLC 270 receives the cell 22 ID and TA value (step 675 in FIG. 6) and decides to utilize the E-OTD positioning method (steps 680 and 690 in FIG. 6 and FIG. 10), the SMLC 270 sends the SMS or USSD command message 282 to the MS 20 (step 100), which includes relevant BTS 24a and 24b identity and coordinate information. Alternatively, the BTS 24a and 24b coordinate information can be broadcast to the MS 20 on the Broadcast Control Channel (BCCH) (not shown). The MS 20 performs the requested E-OTD measurements (step 110) and computes an E-OTD location estimate 298 (step 120), as described hereinbefore in connection with FIG. 4 of the drawings.

Thereafter, the MS 20 stores this calculated location information 298 along with an associate time stamp 299 in a memory 245 (shown in FIG. 4) therein (step 130). If the reporting indicator 288 (shown in FIG. 4) indicates that the MS 20 should report the location information 298 to the requesting LA 280 (step 140), the MS 20 sends this location information 298 back to the MSC 14 (step 160), in the return SMS or USSD message 284 described in FIG. 4 of the drawings. The MSC 14 can forward the location 298 of the MS 20 to the GMLC 290 (step 170), which can, in turn, forward the location information 298 to the requesting LA 280 (step 180). However, if the MS 20 does not need to report the location information 298 (step 140), the MS 20 waits until the positioning indicator 287 (shown in FIG. 4) indicates that the MS 20 should position itself again (step 150), and the MS 20 repeats the positioning process (step 690).

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A mobile station for providing chronicled location information calculated by said mobile station, comprising:

a transceiver unit for receiving a command message to initiate a positioning of said mobile station, said command message including at least an identity indicator for indicating a location node that requested said positioning of said mobile station;

a positioning measurement module for obtaining at least one positioning measurement for said mobile station;

a location calculation module within a smart card, said positioning measurement module not being within said smart card, said location calculation module operatively connected to said positioning measurement module to receive said at least one positioning measurement, said positioning measurement module further for calculating location information associated with the location of said mobile station within a cellular network, using said at least one positioning measurement; and an historical module for receiving said location information, recording said location information and reporting said location information to said requesting node, using said identity indicator.

2. The mobile station of claim 1, further comprising:

a memory connected to said historical module for storing said location information until said historical module reports said location information to said requesting node.

3. The mobile station of claim 2, wherein said memory stores said location information and at least one additional location information for said mobile station calculated at a later time, said historical module reporting said location information and said at least one additional location information to said location node.

4. The mobile station of claim 2, wherein said historical module records said location information and an associated time stamp, said location information and said associated time stamp being stored in said memory, said historical module reporting said location information and said associated time stamp to said location node.

5. The mobile station of claim 1, wherein said command message further includes a positioning indicator indicating the frequency with which said mobile station should perform said positioning.

6. The mobile station of claim 1, wherein said command message further includes a reporting indicator for indicating the frequency with which said historical module should report said location information to said location node.

7. The mobile station of claim 1, wherein said command message is a Short Message Service message.

8. The mobile station of claim 1, wherein said command message is an Unstructured Supplementary Service Data message.

9. The mobile station of claim 1, wherein said transceiver unit is further operable to transmit said location information from said mobile station to said location node via said network.

10. The mobile station of claim 1, wherein said location node is located within said mobile station.

11. The mobile station of claim 1, wherein said positioning measurement module and said location calculation module comprise a Global Positioning System transceiver unit.

12. The mobile station of claim 1, wherein said at least one positioning measurement is an enhanced-observed time difference measurement.

13. A mobile station for providing chronicled location information calculated by said mobile station, comprising:

a transceiver unit for receiving a command message to initiate a positioning of said mobile station, said command message including an identical indicator for indicating a location node that requested said positioning of said mobile station, a positioning indicator indicating the frequency with which said mobile station should perform said positioning and a reporting indicator for indicating the frequency with which said mobile station should report said chronicled location information to said location node;

a positioning measurement module for obtaining at least one positioning measurement for said mobile station;

a location calculation module within a smart card, said positioning measurement module not being within said smart card, said location calculation module operatively connected to said positioning measurement module to receive said at least one positioning measurement, said positioning measurement module further for calculating location information associated with the location of said mobile station within a cellular network, using said at least one positioning measurement;

an historical module for receiving said location information, recording said location information and reporting said location information to said requesting node, using said identity indicator; and a memory connected to said historical module for storing said location information until said historical module reports said location information to said requesting node.

14. The mobile station of claim 13, wherein said memory stores said location information and at least one additional location information for said mobile station calculated at a later time, said mobile station reporting said location information and said at least one additional location information to said location node.

15. The mobile station of claim 13, wherein said command message is a Short Message Service message.

16. The mobile station of claim 13, wherein said command message is an Unstructured Supplementary Service Data message.

17. The mobile station of claim 13, wherein said positioning measurements are Global Positioning System measurements.

18. The mobile station of claim 13, wherein said positioning measurements are enhanced-observed time difference measurements.

19. A method for providing chronicled location information calculated by a mobile station within a cellular network, comprising the steps of:

receiving, by said mobile station, a command message to initiate a positioning of said mobile station, said command message including at least an identity indicator for identifying a location node that requested said positioning of said mobile station;

obtaining at least one positioning measurement by a positioning measurement module within said mobile station;

calculating location information associated with the location of said mobile station within a cellular network, using a location calculation module within a smart card of said mobile station., said positioning measurement module not being within said smart card, said location calculation module operatively connected to said positioning measurement module to receive said at least one positioning measurement, said positioning measurement module calculating said location information using said at least one positioning measurement; and reporting, by said mobile station, said location information to said requesting node, using said identity indicator.

20. The method of claim 19, further comprising the step of:

storing said location information in a memory within said mobile station.

21. The method of claim 20, wherein said step of storing further comprises the step of:

storing an associated time stamp with said location information in said memory; and wherein said step of reporting further comprises the step of:

reporting said location information and said associated time stamp to said location node.

22. The method of claim 19, wherein said steps of obtaining and calculating are repeated at a frequency indicated within said command message.

23. The method of claim 22, wherein said step of reporting further comprises the step of:

reporting, to said location node, said location information calculated at said frequency.

24. The method of claim 19, wherein said step of reporting further comprises the step of:

reporting said location information to said location node at a defined frequency indicated within said command message.

25. The method of claim 19, wherein said step of reporting further comprises the step of:

transmitting said location information from said mobile station to said location node via said cellular network.

26. The method of claim 19, wherein said step of reporting further comprises the step of:

reporting said location information to said location node within said mobile station.

27. The method of claim 19, wherein said at least one positioning measurement is a Global Positioning System positioning measurement.

28. The method of claim 19, wherein said at least one positioning measurement is an enhanced-observed time difference measurement.

* * * * *

UNITED STATES PATENT AND TRADEMARK OFFICE
CERTIFICATE OF CORRECTION

PATENT NO. : 6,295,454 B1  
DATED : September 25, 2001  
INVENTOR(S) : Havinis et al.

Page 1 of 1

It is certified that error appears in the above-identified patent and that said Letters Patent is hereby corrected as shown below:

<u>Column 10,</u>  
Line 66, replace "identical" with -- identity --.

Signed and Sealed this

Fifth Day of March, 2002

Attest:

*Attesting Officer*

JAMES E. ROGAN  
*Director of the United States Patent and Trademark Office*